(12) United States Patent
Oettinger

(10) Patent No.: US 9,014,305 B2
(45) Date of Patent: Apr. 21, 2015

(54) BI-PHASE COMMUNICATION DEMODULATION TECHNIQUES

(75) Inventor: Eric Gregory Oettinger, Rochester, NH (US)

(73) Assignee: Texas Instruments Incorporated, Dallas, TX (US)

( * ) Notice: Subject to any disclaimer, the term of this patent is extended or adjusted under 35 U.S.C. 154(b) by 673 days.

(21) Appl. No.: 13/337,674

(22) Filed: Dec. 27, 2011

(65) Prior Publication Data

US 2012/0326657 A1    Dec. 27, 2012

Related U.S. Application Data

(60) Provisional application No. 61/500,417, filed on Jun. 23, 2011, provisional application No. 61/500,374, filed on Jun. 23, 2011, provisional application No. 61/500,356, filed on Jun. 23, 2011.

(51) Int. Cl.
  *H04L 27/00* (2006.01)
  *H02J 7/02* (2006.01)
  *H04L 25/49* (2006.01)
  *H04L 7/04* (2006.01)

(52) U.S. Cl.
  CPC .............. *H02J 7/025* (2013.01); *H04L 25/4904* (2013.01); *H04L 7/042* (2013.01); *H04L 7/046* (2013.01)

(58) Field of Classification Search
  CPC ..... H04L 7/042; H04L 7/046; H04L 25/4904; H02J 7/025
  USPC ......... 375/316, 322, 324, 333, 342, 361, 365, 375/366
  See application file for complete search history.

(56) References Cited

U.S. PATENT DOCUMENTS

| | | | |
|---|---|---|---|
| 4,903,022 A | 2/1990 | Hester et al. | |
| 6,567,482 B1 * | 5/2003 | Popovic' | 375/343 |
| 7,480,009 B2 * | 1/2009 | Cheon et al. | 348/521 |
| 2003/0195645 A1 | 10/2003 | Pillay et al. | |
| 2004/0056785 A1 | 3/2004 | Webster et al. | |
| 2004/0136468 A1 * | 7/2004 | Suzuki | 375/295 |
| 2007/0071036 A1 * | 3/2007 | Okunev et al. | 370/503 |
| 2009/0028279 A1 | 1/2009 | Kitta | |

OTHER PUBLICATIONS

PCT Search Report mailed Jan. 17, 2013.

* cited by examiner

*Primary Examiner* — Leon Flores
(74) *Attorney, Agent, or Firm* — William B. Kempler; Frank D. Cimino

(57) ABSTRACT

One aspect of the present invention includes a bi-phase communication receiver system. The system includes an analog-to-digital converter (ADC) configured to sample a bi-phase modulation signal to generate digital samples of the bi-phase modulation signal. The system also includes a bi-phase signal decoder configured to decode the bi-phase modulation signal based on the digital samples. The system further includes a preamble detector comprising a digital filter configured to evaluate the digital samples to generate an output and to detect a preamble of the bi-phase modulation signal for decoding the bi-phase modulation signal based on the output.

34 Claims, 5 Drawing Sheets

BI-PHASE COMMUNICATION DEMODULATION TECHNIQUES

CROSS REFERENCE TO RELATED APPLICATION

The present application claims filing benefit of U.S. Provisional Application Nos. 61/500,417; 61/500,374; and 61/500,356, each having a filing date of Jun. 23, 2011, which are incorporated herein by reference in their entirety.

TECHNICAL FIELD

The present invention relates generally to electronic circuits, and specifically to bi-phase communication demodulation techniques.

BACKGROUND

One example of a coding scheme that can be utilized for transferring data is bi-phase modulation. Each bit-window (i.e., period) of a bi-phase modulation signal represents a single logic bit, with each bit-window beginning with a logic-state edge-transition. A logic-low is represented by a substantially constant logic-state through the bit-window, whereas a logic-high is represented by an additional logic-state edge-transition in the approximate center of the bit-window.

When the amplitude of a bi-phase modulation signal is sufficient, any of a variety of different decoding algorithms can be implemented to decode the bi-phase modulation signal. However, as the amplitude of the signal decreases, such as due to filtering and/or transmission medium losses, decoding the bi-phase modulation signal can be difficult. For example, the presence of noise can make it more difficult to align the period of the bi-phase modulation signal to the receiver, such as based on synchronizing the receiver to a preamble of the bi-phase modulation signal. In addition, in some bi-phase modulation signal transmission implementations, there may be no external clock to align the phase and/or frequency of the bi-phase modulation signal, which can further complicate decoding of the bi-phase modulation signal. As an example, a frequency mismatch between the transmitter and receiver clocks can result in demodulation errors in decoding the bi-phase modulation signal.

SUMMARY

One aspect of the present invention includes a bi-phase communication receiver system. The system includes an analog-to-digital converter (ADC) configured to sample a bi-phase modulation signal to generate digital samples of the bi-phase modulation signal. The system also includes a bi-phase signal decoder configured to decode the bi-phase modulation signal based on the digital samples. The system further includes a preamble detector comprising a digital filter configured to evaluate the digital samples to generate an output and to detect a preamble of the bi-phase modulation signal for decoding the bi-phase modulation signal based on the output.

Another embodiment of the present invention includes a method for detecting a preamble of a bi-phase modulation signal. The method includes sampling a bi-phase modulation signal at a sampling rate to generate consecutive digital samples of the bi-phase modulation signal. The method also includes iteratively shifting each of the consecutive digital samples into a finite impulse response (FIR) filter comprising filter taps having tap weights comprising values associated with at least one period of the preamble of the bi-phase modulation signal. The method also includes generating an output from the FIR filter based on mathematically evaluating a proper subset of the digital samples having been iteratively shifted into the FIR filter relative to the respective proper subset of the filter taps at each iteration. The method further includes comparing the output from the FIR filter with a threshold and detecting the preamble of the bi-phase modulation signal for decoding of the bi-phase modulation signal in response to the output from the FIR filter being greater than the threshold.

Another embodiment of the present invention includes a bi-phase communication receiver system. The system includes a channel selection controller configured to compare an amplitude of a first bi-phase modulation channel and a second bi-phase modulation channel associated with a bi-phase modulation signal. The channel selection controller can be further configured to select one of the first and second bi-phase modulation channels for processing and to discard the other of the first and second bi-phase modulation channels based on a relative amplitude of the first and second bi-phase modulation channels. The system also includes a preamble detector configured to detect a preamble of the selected bi-phase modulation channel and a bi-phase signal decoder configured to decode the selected bi-phase modulation channel.

Another embodiment of the present invention includes a bi-phase communication receiver system. The system includes an ADC configured to sample a bi-phase modulation signal to generate digital samples of the bi-phase modulation signal. The system also includes a bi-phase signal decoder configured to decode the bi-phase modulation signal based on the digital samples. The system also includes a preamble detector comprising a FIR filter comprising filter taps having preprogrammed tap weights with which the digital samples are evaluated to generate an output having peak maxima corresponding to alignment of the period of the preamble of the bi-phase modulation signal with the filter taps. The system further includes a synchronization controller configured to detect a clock frequency mismatch between the bi-phase communication receiver system and an associated transmitter based on the peak maxima and to adjust a sampling rate of the ADC based on the detected mismatch to substantially compensate for the clock frequency mismatch between the bi-phase communication receiver system and an associated transmitter.

DETAILED DESCRIPTION

Figure 1:
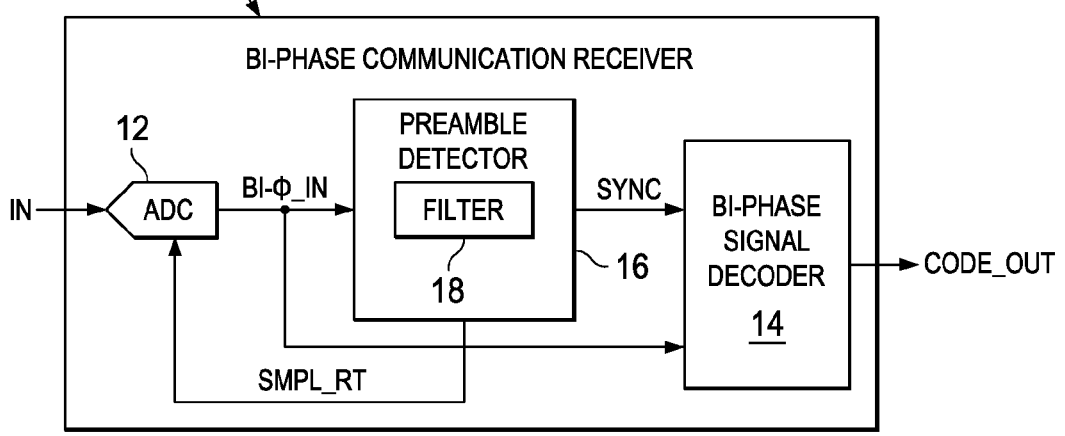
FIG. 1 illustrates an example of a bi-phase communication receiver in accordance with an aspect of the invention.

The present invention relates generally to electronic circuits, and specifically to bi-phase communication demodulation techniques. A bi-phase communication receiver includes a preamble detector that is configured to align a period of a bi-phase modulation signal with a bi-phase signal decoder. The preamble detector includes at least one digital filter, such as a finite impulse response (FIR) filter, that is programmed with a specific set of tap weights that are associated with at least one known bit-period of the preamble of the bi-phase modulation signal. The preamble detector thus shifts digital samples of the bi-phase modulation signal through the digital filter. The digital filter can provide an output to a second digital filter having a set of tap weights that are associated with logic-transitions. As a result, the second digital filter can provide an output having a high magnitude upon alignment of the period of the preamble of the bi-phase modulation signal with the set of tap weights of the first and second digital filters. Accordingly, the preamble detector can be configured to align the bi-phase modulation signal with the bi-phase signal decoder based on the detecting the preamble even in the presence of a large amount of noise.

In addition, the preamble detector can be configured to compensate for clock frequency mismatch between the transmitter and the receiver in the bi-phase modulation communication system. For example, in a wireless power communications application, the transmitter clock and the receiver clock may be separate, such that they cannot operate from the same frequency reference. As a result, the transmitter and receiver may have a clock frequency mismatch relative to each other, such as resulting in errors in decoding the bi-phase modulation signal. The preamble detector can thus include a synchronization controller configured to adjust the sampling rate of the analog-to-digital converter (ADC) of the bi-phase communication receiver based on the digital samples implemented by the preamble controller. For example, the synchronization controller can count a number of digital samples between consecutive peak maxima output from the at least one digital filter to detect a frequency mismatch, and can provide a signal, such as via a proportional/integral control loop, that is indicative of the mismatch to adjust the sampling rate of the ADC.

Furthermore, the bi-phase communication receiver can be configured to monitor two separate channels associated with the bi-phase modulation signal to avoid null zone switching associated with logic-state transitions of the bi-phase modulation signal. As an example, the two separate channels can include a current associated with a primary winding of a transformer and a voltage across a resonant capacitor in a wireless power application. The bi-phase communication receiver can include a channel selection controller that is configured to monitor a relative power level associated with each of the two separate channels and to select a channel for demodulation based on the relative power level. The channel selection controller can thus be configured to select the channel having the highest power level and discard the other channel, such that the bi-phase signal decoder only demodulates the selected channel, as opposed to typical bi-phase demodulators that demodulate both channels redundantly. Accordingly, the bi-phase communication receiver can greatly conserve processing resources relative to typical bi-phase demodulators.

FIG. 1 illustrates an example of a bi-phase communication receiver 10 in accordance with an aspect of the invention. The bi-phase communication receiver 10 is configured to receive a bi-phase modulation signal IN and to decode the bi-phase modulation signal IN to generate an output code CODE_OUT. Each bit-window of the bi-phase modulation signal IN can represent a single logic bit, with each bit-window beginning with a logic state transition. A logic-low can be represented by a substantially constant logic state through the bit-window, whereas a logic-high can be represented by an additional logic state transition in the approximate center of the bit-window. The bi-phase communication receiver 10 can be implemented in any of a variety of electronic communications applications. As an example, the bi-phase communication receiver 10 can be implemented in a wireless power communication application.

The bi-phase communication receiver 10 includes an analog-to-digital converter (ADC) 12 configured to sample the bi-phase modulation signal IN to generate consecutive digital samples of the bi-phase modulation signal IN. In the example of FIG. 1, the digital representation of the bi-phase modulation signal IN is demonstrated as a signal BI-Φ_IN. As an example, the ADC 12 can be configured to provide eight times oversampling of the bi-phase modulation signal IN, which can have a data frequency of approximately 2 kHz, such that the ADC 12 can have a sampling rate of approximately 16 kHz. Accordingly, the bi-phase modulation signal IN can be represented by eight digital samples for each bit in the signal BI-Φ_IN. The bi-phase communication receiver 10 also includes a bi-phase signal decoder 14 that is configured to decode the digital samples in the signal BI-Φ_IN to generate the output code CODE_OUT. As an example, the bi-phase signal decoder 14 can decode the digital samples in the signal BI-Φ_IN in any of a variety of ways.

The bi-phase communication receiver 10 further includes a preamble detector 16 that is configured to evaluate the digital samples in the signal BI-Φ_IN to align the period of the bi-phase modulation signal IN to the bi-phase signal decoder 14. Therefore, the bi-phase signal decoder 14 can be synchronized with the bi-phase modulation signal IN for proper decoding based on the operation of the preamble detector 16. In the example of FIG. 1, the preamble detector 16 includes a digital filter 18 configured to evaluate the digital samples in the signal BI-Φ_IN, such that the preamble detector 16 can identify logic state transitions that represent the approximate beginning and center of each bit period in the preamble of the bi-phase modulation signal IN. As an example, the digital filter 18 can be configured as a finite-impulse response (FIR) filter, such that the first FIR filter includes filter taps that are preprogrammed with tap weights associated with at least one period of the preamble for evaluating the digital samples of the signal BI-Φ_IN.

The digital filter 18 can also be configured as a two-stage filter system, such that the digital filter 18 can include a second FIR filter that includes filter taps that are preprogrammed with tap weights associated with logic state transitions of the preamble for evaluating the output of the first FIR filter. Therefore, the two-stage filter system of the digital filter 18 can be configured to detect the preamble of the bi-phase modulation signal IN with the bi-phase signal decoder 14 in a particularly noisy environment. In response to detecting the period of the preamble of the bi-phase modulation signal IN, the preamble detector 16 can be configured to provide a signal SYNC to the bi-phase signal decoder 14, such that the signal SYNC can be indicative of which of the digital samples of the signal BI-Φ_IN corresponds to the beginning of a period of the bi-phase modulation signal IN for proper decoding by the bi-phase signal decoder 14, such that the signal SYNC can be indicative of a phase of the signal BI-Φ_IN.

Furthermore, in addition to detecting the preamble of the bi-phase modulation signal IN, the preamble detector 16 can further be configured to adjust the sampling rate of the ADC 12 in response to evaluating the digital samples of the signal BI-Φ_IN. Therefore, the preamble detector 16 can substantially compensate for a clock frequency mismatch between the bi-phase communication receiver system 10 and an associated transmitter, such as in a wireless power communication application. For example, the preamble detector 16 can count a number of samples between peak maxima in the output of the digital filter 18 to detect the mismatch between the clock frequency of the bi-phase communication receiver system 10 and the associated transmitter. The preamble detector 16 can thus provide a signal SMPL_RT to the ADC 12 to adjust the sampling rate of the ADC 12 to substantially compensate for the clock frequency mismatch.

Figure 2:
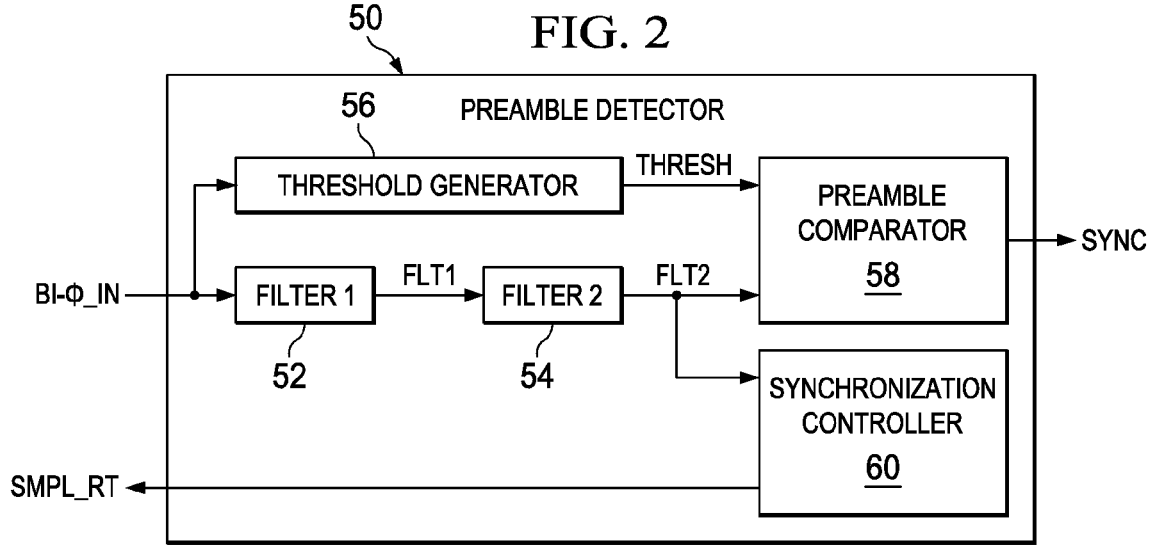
FIG. 2 illustrates an example of a preamble detector in accordance with an aspect of the invention.

FIG. 2 illustrates an example of a preamble detector 50 in accordance with an aspect of the invention. The preamble detector 50 can be configured substantially similar to the preamble detector 16 in the example of FIG. 1. Therefore, reference is to be made to the example of FIG. 1 in the following description of the example of FIG. 2.

The preamble detector 50 includes a first digital filter 52 that is configured to evaluate the digital samples of the signal BI-Φ_IN. As an example, the first digital filter 52 can be configured as a FIR filter including filter taps that are preprogrammed with tap weights associated with at least one period of the preamble of the bi-phase modulation signal IN, such as demonstrated in the example of FIG. 3.

Figure 3:
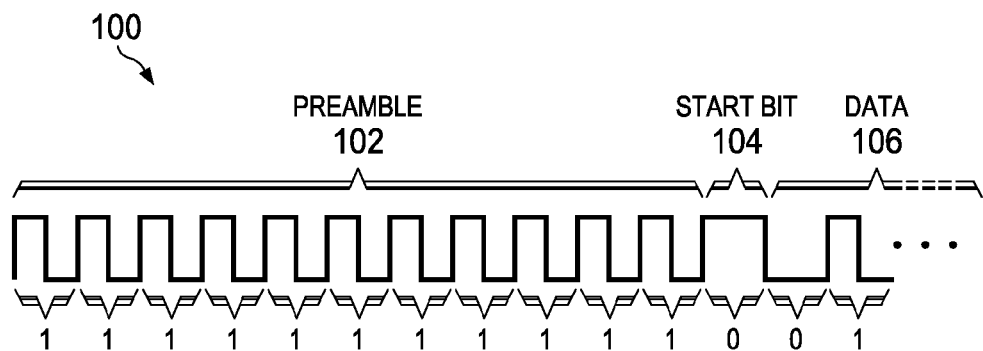
FIG. 3 illustrates an example of a bi-phase communication signal in accordance with an aspect of the invention.

FIG. 3 illustrates an example of a bi-phase communication signal 100 in accordance with an aspect of the invention. The bi-phase communication signal 100 can correspond to the bi-phase modulation signal IN, and can be referred to interchangeably as such herein. In addition, it is to be understood that the bi-phase communication signal 100 is demonstrated in the example of FIG. 3 as ideal, such that it is demonstrated as being substantially unaffected by noise and/or other interference.

The bi-phase communication signal 100 includes a preamble portion 102, a start bit portion 104, and a data portion 106. Therefore, the bi-phase communication signal 100 in the example of FIG. 3 can represent a single packet of a bi-phase communication session, such as transmitted from a transmitter to the bi-phase communication receiver system 10 in the example of FIG. 1. In the example of FIG. 3, the preamble portion 102 includes eleven consecutive logic-1 bits. As an example, the eleven consecutive logic-1 bits can be mandated, as of the time of this submission, by the Wireless Power Consortium (WPC) as including the eleven consecutive logic-1 bits in the preamble portion 102. Accordingly, each period of the preamble portion 102 of the bi-phase modulation signal 100 begins with a logic-high transition and includes a logic-low transition in an approximate center of the bit-period. Based on the eight times oversampling by the ADC 12, each bit of the bi-phase modulation signal 100 can be represented by eight digital samples, such that in the preamble portion 102, absent clock frequency mismatch between the transmitter and the bi-phase communication receiver system 10, four digital samples can represent the logic-high portions and four digital samples can represent the logic-low portions of each bit-period of the preamble portion 102.

Figure 4:
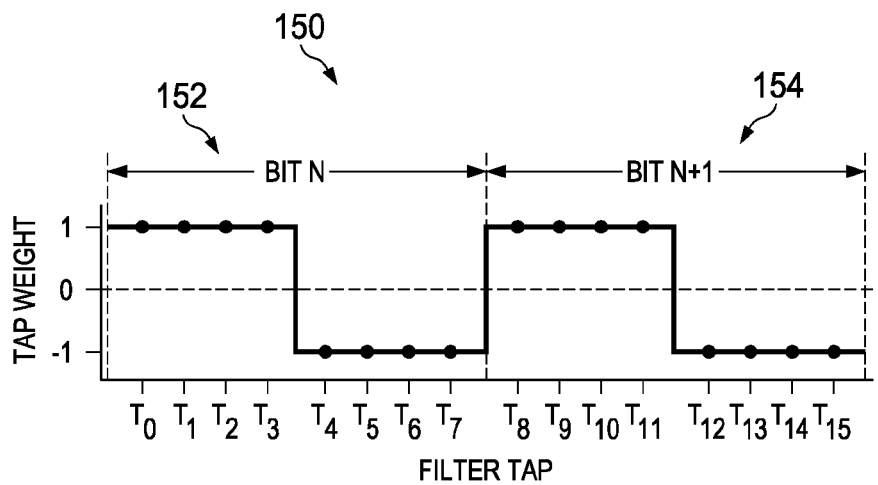
FIG. 4 illustrates an example of a graph of a set of filter taps in accordance with an aspect of the invention.

As described previously, the first digital filter 52 in the example of FIG. 2 can include filter taps that are preprogrammed with tap weights associated with at least one period of the preamble of the bi-phase modulation signal IN, and thus the bi-phase modulation signal 100. FIG. 4 illustrates an example of a graph 150 of a set of filter taps in accordance with an aspect of the invention. The graph 150 can thus correspond to the filter taps associated with first digital filter 52. The graph 150 includes two bit-periods, demonstrated at 152 and 154, of filter taps, and thus a total of sixteen filter taps, labeled in the example of FIG. 4 as $T_0$ through $T_{15}$, based on the eight times oversampling of the ADC 12 in the example of FIG. 1.

Because the filter taps $T_0$ through $T_{15}$ of the first digital filter 52 are associated with a period of the preamble portion 102 of the bi-phase modulation signal 100 in each of the bit-periods 152 and 154, the filter taps $T_0$ through $T_{15}$ are arranged as two consecutive logic-1 bits. Specifically, in the first bit period 152, the first four filter taps $T_0$ through $T_3$ are logic-high relative to a common "0", and thus each have a tap weight of "1", while the second four filter taps $T_4$ through $T_7$ are logic-low relative to the common "0", and thus each have a tap weight of "−1". Similarly, in the second bit period 154, the first four filter taps $T_8$ through $T_{11}$ are logic-high relative to the common "0", and thus each have a tap weight of "1", while the second four filter taps $T_{12}$ through $T_{15}$ are logic-low relative to the common "0", and thus each have a tap weight of "−1". Thus, each of the filter taps $T_0$ through $T_{15}$ can correspond to respective digital samples of the signal BI-Φ_IN that are input to the first digital filter 52 for detecting the preamble of the bi-phase modulation signal 100.

Referring back to the example of FIG. 2, the first digital filter 52 is configured to iteratively shift each of the digital samples of the signal BI-Φ_IN into the first digital filter 52 and to generate an output at each iteration. As an example, the first digital filter 52 can be configured to generate a scalar dot product at each iteration, such that the first digital filter 52 can multiply each digital sample of the signal BI-Φ_IN by the respective one of the filter tap weights $T_0$ through $T_{15}$ and generate a sum of the products as the output. In the example of FIG. 2, the output of the first digital filter 52 is demonstrated as the signal FLT1. Therefore, based on the filter taps $T_0$ through $T_{15}$ of the first digital filter 52 being associated with the predetermined two periods of the preamble portion 102 of the bi-phase modulation signal 100, alignment of the preamble portion 102 with the filter taps $T_0$ through $T_{15}$ will provide peak maxima output values of the signal FLT1 provided from the first digital filter 52. In other words, upon alignment of the preamble portion 102 of the bi-phase modulation signal 100 with the filter taps $T_0$ through $T_{15}$, the highest digital sample values (i.e., logic-high) are multiplied by the "+1" tap weights and the lowest digital sample values (i.e., logic-low) are multiplied by the "−1" tap weights, thus resulting in a greater absolute value magnitude of the signal FLT1 than a shift of the digital samples in either direction up to 180 degrees, with a 180 degree shift corresponding to negative peak maxima. Accordingly, each positive peak maxima of the signal FLT1 can correspond to alignment of the preamble portion 102 of the bi-phase modulation signal 100 with the filter taps $T_0$ through $T_{15}$.

In addition, upon evaluating a first sixteen digital samples of the signal BI-Φ_IN, the first digital filter 52 can be configured to evaluate a proper subset of the digital samples having been shifted into the first digital filter 52 to determine the output value of the signal FLT1. As an example, at each iteration the first digital filter 52 can evaluate a new digital sample shifted into the first digital filter 52, a digital sample shifted out of the first digital filter 52, and digital samples shifted to respective filter taps associated with logic transitions of the preamble portion 102 of the bi-phase modulation signal 100 relative to the respective filter taps, and can add the sum of the evaluations to an immediately preceding value of the output value of the signal FLT1. Specifically, referring to the example of FIG. 4, upon shifting each of the digital samples one filter tap to the right at a given iteration, the value of the signal FLT1 can be expressed as follows:

$$FLT1 = FLT1' + S\_T_0 - 2*S\_T_4 + 2*S\_T_8 - 2*S\_T_{12} + S\_T_{15}'$$  Equation 1

Where:

FLT1' is the immediately preceding value of the signal FLT1;

$S\_T_0$ is a product of the digital sample at the tap $T_0$ and the associated weight;

$S\_T_4$ is a product of the digital sample at the tap $T_4$ and the associated weight;

$S\_T_8$ is a product of the digital sample at the tap $T_8$ and the associated weight;

$S\_T_{12}$ is a product of the digital sample at the tap $T_{12}$ and the associated weight;

$S\_T_{15}'$ is a product of the digital sample formerly at the tap $T_{15}$, prior to the iterative shift, and the associated tap weight.

Equation 1 thus demonstrates a manner of calculating the magnitude of the signal FLT1 based on evaluating only the digital samples that shift through logic transitions associated with the filter taps $T_0$ through $T_{15}$ of the first digital filter 52. Therefore, as a result of implementing Equation 1, the first digital filter 52 can be configured to calculate the magnitude of the signal FLT1 in a significantly more efficient manner than continuously calculating the scalar dot product at each iteration based on evaluating all sixteen filter taps of the first digital filter 52.

In the example of FIG. 2, the preamble detector 50 also includes a second digital filter 54 that is configured to evaluate the output signal FLT1 of the first digital filter 52. As an example, the second digital filter 54 can be configured as a FIR filter including filter taps that are preprogrammed with tap weights associated with logic transitions of the bi-phase modulation signal 100, such as demonstrated in the examples of FIGS. 3 and 5. The second digital filter 54 can thus be configured to amplify the peaks of the signal FLT1 to provide amplification and further filtering of the output signal provided from the first digital filter 52.

Figure 5:
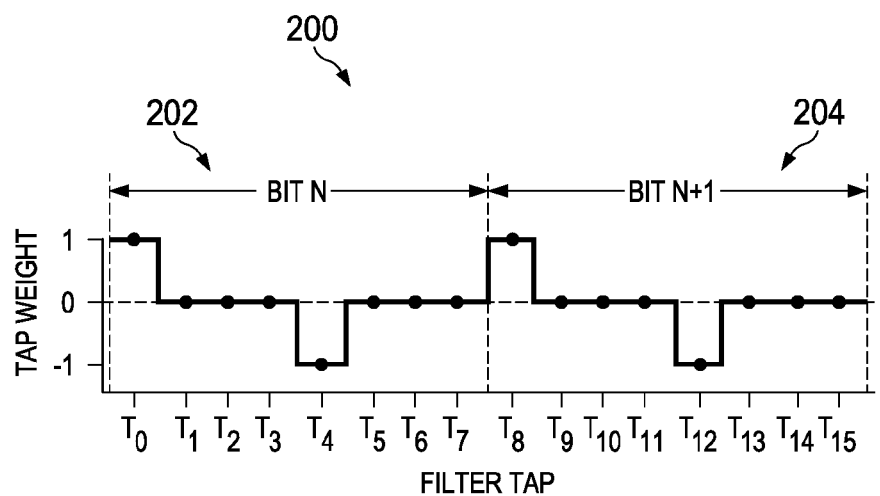
FIG. 5 illustrates another example of a graph of a set of filter taps in accordance with an aspect of the invention.

FIG. 5 illustrates another example of a graph 200 of a set of filter taps in accordance with an aspect of the invention. The graph 200 can thus correspond to the filter taps associated with second digital filter 54. The graph 200 includes two bit-periods, demonstrated at 202 and 204, of filter taps, and thus a total of sixteen filter taps, labeled in the example of FIG. 5 as $T_0$ through $T_{15}$, based on the eight times oversampling of the ADC 12 in the example of FIG. 1, similar to as described previously in the example of FIG. 4.

As described previously, the filter taps $T_0$ through $T_{15}$ of the second digital filter 54 are associated only with logic transitions of the bi-phase modulation signal 100. Specifically, in the first bit period 202, the first filter tap $T_0$ is logic-high relative to a common "0", and thus has a tap weight of "1", based on the logic-high transition at the beginning of each bit-period of the preamble portion 102 of the bi-phase modulation signal 100. Similarly, the fifth filter tap $T_4$ is logic-low relative to a common "0", and thus has a tap weight of "−1", based on the logic-low transition in the approximate center of each bit-period of the preamble portion 102 of the bi-phase modulation signal 100. In the second bit period 204, the first filter tap $T_8$ likewise has a tap weight of "1" and the fifth filter tap $T_{12}$ likewise has a tap weight of "−1". The remaining filter taps of the second digital filter 54 all have a tap weight of "0".

Similar to as described previously regarding the first digital filter 52, the second digital filter 54 is configured to iteratively shift the output signal FLT1 into the filter taps of the second digital filter 54 to generate an output at each iteration. The second digital filter 54 can be configured to generate a scalar dot product at each iteration, such that the second digital filter 54 can multiply each iterative value of the output signal FLT1 by the respective one of the filter tap weights $T_0$ through $T_{15}$ and generate a sum of the products as the output. In the example of FIG. 2, the output of the second digital filter 54 is demonstrated as the signal FLT2.

As described previously, the output resulting from alignment of the preamble portion 102 with the filter taps $T_0$ through $T_{15}$ of the first digital filter 52 will provide peak maxima output values of the signal FLT1. Therefore, based on the filter taps $T_0$ through $T_{15}$ of the second digital filter 54 being associated with the logic transitions of two periods of the preamble portion 102 of the bi-phase modulation signal 100, alignment of the preamble portion 102 of the bi-phase modulation signal 100 can be greatly accentuated by the second digital filter 54. As an example, alignment of the preamble portion 102 with the filter taps $T_0$ through $T_{15}$ of the first digital filter 52 can likewise result in alignment of the positive peak maxima of the signal FLT1 with the filter taps $T_0$ and $T_8$ of the second digital filter 54 and alignment of the negative peak maxima of the signal FLT1 with the filter taps $T_4$ and $T_{12}$ of the second digital filter 54. Accordingly, the second digital filter 54 can greatly amplify and filter the positive and negative peak maxima of the signal FLT1 and provide the amplified and filtered peak maxima as the signal FLT2, thus likewise indicating alignment of the preamble portion 102 of the bi-phase modulation signal 100 with the filter taps $T_0$ through $T_{15}$ of the first digital filter 52.

In addition, because the second digital filter 54 greatly amplifies and further filters the signal FLT1 output from the first digital filter 52, the second digital filter 54 can provide much better detection of the preamble of the bi-phase modulation signal IN, such as in an environment that is subject to large amounts of noise or other interference. Also, the operation of the first and second digital filters 52 and 54 as a two-stage filter system for detection of the preamble of the bi-phase modulation signal IN can be significantly more simple and can be implemented in a significantly smaller size package than typical analog filtering and preamble detection systems. Furthermore, by implementing the first digital filter 52 using the algorithm demonstrated in Equation 1, and by implementing the second digital filter 54 to only evaluate the logic-transitions of the bi-phase modulation signal IN (e.g., summing four numbers), the digital filtering technique of the first and second digital filters 52 and 54 can require only a small amount of processing resources, such as to devote a relatively small number of machine instructions per second (MIPS) to preamble detection and/or alignment for decoding the bi-phase modulation signal IN.

In the example of FIG. 2, the preamble detector 50 also includes a threshold generator 56 and a preamble comparator 58. The threshold generator 56 is configured to generate a threshold value, demonstrated in the example of FIG. 2 as a signal THRESH, based on the digital samples of the signal BI-Φ_IN. As an example, the threshold signal THRESH can be generated based on an amplitude of the digital samples of the signal BI-Φ_IN, such that variations in the overall amplitude of the bi-phase modulation signal IN can be compensated for by the preamble detector 50. For instance, the threshold generator 56 can be configured as an infinite impulse response (IIR) filter configured to calculate the threshold THRESH as a moving average of the absolute value of the digital samples of the signal BI-Φ_IN based on a predetermined number of digital samples. One exemplary manner in which the threshold signal THRESH can be calculated is demonstrated as follows:

$$THRESH = K*(THRESH'*31 + S(ABS(NEW)))/32 \quad \text{Equation 2}$$

Where:
- THRESH' is an immediately preceding value of the threshold signal THRESH;
- S(ABS(NEW)) is an absolute value of a next digital sample of the signal BI-Φ_IN; and
- K is an arbitrary scale factor.

Equation 2 thus calculates the threshold signal THRESH as a moving average of 32 digital samples. Therefore, based on Equation 2, the threshold signal THRESH can be tuned to accommodate variation in the amplitude of the bi-phase modulation signal IN. It is to be understood that the threshold generator 56 is not limited to implementing Equation 2 to generate a moving average of the threshold signal THRESH, but that the moving average could be based on different scale factors relative to moving average of more or less than 32 digital samples.

The threshold signal THRESH and the output signal FLT2 provided from the second digital filter 54 are each provided to the preamble comparator 58. The preamble comparator 58 is thus configured to detect of the period of the bi-phase modulation signal IN in response to the magnitude of the signal FLT2 being greater than the threshold signal THRESH. As an example, the preamble comparator 58 can determine the presence of the bi-phase modulation signal IN based on one comparison of the signal FLT2 with the threshold signal THRESH or based on multiple comparisons (i.e., redundant comparisons, such as at every eight iterations). As a result, the preamble comparator 58 can generate the signal SYNC that is provided to the bi-phase signal decoder 14 in the example of FIG. 1 to indicate detection and/or alignment of the digital samples of the signal BI-Φ_IN for proper decoding of the bi-phase modulation signal IN.

In addition to detecting and/or aligning the preamble of the bi-phase modulation signal IN, the preamble detector 50 can also be configured to adjust the sampling rate of the ADC 12 in response to evaluating the digital samples of the signal BI-Φ_IN. Therefore, the preamble detector 50 can substantially compensate for a clock frequency mismatch between the bi-phase communication receiver system 10 and an associated transmitter, such as in a wireless power communication application. In the example of FIG. 2, the preamble detector 50 also includes a synchronization controller 60 configured to monitor the output signal FLT2 provided from the second digital filter 54. The synchronization controller 60 can thus generate the signal SMPL_RT that is provided to the ADC 12 to adjust the sampling rate based on the evaluation of the output signal FLT2.

Figure 6:
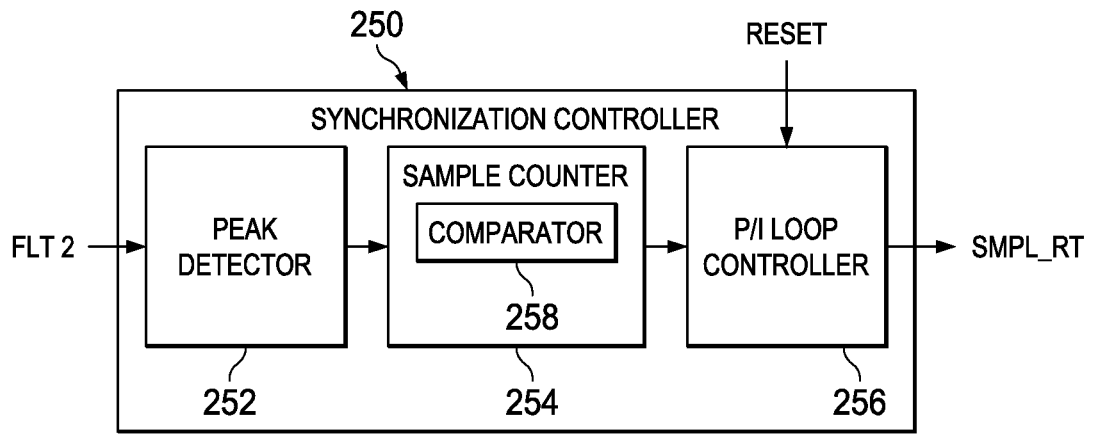
FIG. 6 illustrates an example of a synchronization controller in accordance with an aspect of the invention.

FIG. 6 illustrates an example of a synchronization controller 250 in accordance with an aspect of the invention. The synchronization controller 250 can be configured substantially similar to the synchronization controller 60 in the example of FIG. 2. Therefore, reference is to be made to the example of FIGS. 1 and 2 in the following description of the example of FIG. 6.

The synchronization controller 250 includes a peak detector 252, a sample counter 254, and a proportional/integral (P/I) loop controller 256. The peak detector 252 is configured to receive the output signal FLT2 provided from the second digital filter 54. It is to be understood that, while the peak detector 252 is demonstrated as evaluating the output signal FLT2 provided from the second digital filter 54, the peak detector 252 could alternatively evaluate the output signal FLT1 provided from the first digital filter 52. The peak detector 252 can be configured to detect the peak maxima of the signal FLT2, such as the positive peak maxima or the negative peak maxima. It is to be understood that the peak detector 252 could operate independently of the preamble comparator 58, or could be associated with the preamble comparator 58, such that the preamble comparator 58 detects the peak maxima based on the threshold signal THRESH, as described previously, and provides the information associated with the detected peak maxima to the synchronization controller 250.

Upon determining a peak maximum of the signal FLT2, the peak detector 252 invokes the sample counter 254 to count the number of digital samples of the signal BI-Φ_IN between a plurality of subsequent peak maxima of the signal FLT2. The sample counter 254 can thus count the number of digital samples and compare the number of digital samples to an expected number of digital samples via a comparator 258. For example, based on a 16 kHz sampling rate of the ADC 12, as described previously in the examples of FIGS. 1-5, the sample counter 254 can compare the counted number of digital samples with a total of eight expected digital samples between each peak maxima (e.g., including one of the peak maxima). The sample counter 254 can count the number of digital samples over a plurality of peak maxima to ensure that a small mismatch in the clock frequencies between the transmitter and the bi-phase communication receiver system 10 can be detected.

The sample counter 254 provides the difference information between the counted digital samples of the signal BI-Φ_IN and the expected number of digital samples to the P/I loop controller 256. The P/I loop controller 256 thus provides proportionality and integral calculations to generate a signal SMPL_RT that is fed back to the ADC 12 to adjust the sample rate of the ADC 12, such as to compensate for a clock frequency mismatch between the bi-phase communication receiver 10 and the associated transmitter. For example, the P/I loop controller 256 can be programmed with a proportionality gain that allows rapid adjustment to the sampling rate, particularly for an initial communication session that is established between the bi-phase communication receiver 10 and the associated transmitter. As another example, the P/I loop controller 256 can be programmed with a substantially slow integral term to allow the sampling rate of the ADC 12 to converge on the clock frequency of the associated transmitter. The P/I loop controller 256 can thus generate the signal SMPL_RT to be indicative of a difference between the clock frequencies (i.e., the clock frequency of the transmitter and the current sampling rate of the ADC 12), such that the ADC 12 can be adjusted accordingly.

In the example of FIG. 6, the synchronization controller 250 can be configured to set a default value for the sampling rate of the ADC 12, such as 16 kHz, upon initiating a communication session. Thus, the sampling rate of the ADC 12 can be adjusted accordingly during the communication session by the synchronization controller 250. As an example, because the integral term may be programmed to provide relatively slower adjustments to the sampling rate of the ADC 12, the sampling rate of the ADC 12 may not be substantially synchronized to the clock frequency of the associated transmitter within a preamble portion 102 of a given packet of a bi-phase modulation signal 100. Thus, the synchronization controller 250 can be configured to continue adjusting the sampling rate of the ADC 12 during the preamble portion 102 of a next packet of the bi-phase modulation signal 100, and so forth, until the ADC 12 has a sampling rate that has substantially converged on the clock frequency of the transmitter. Upon the bi-phase communication receiver 10 registering communication with a new transmitter (e.g., as indicated by a new device identification), the P/I loop controller 256 can be configured to receive a reset signal RESET, such as provided by a processor, that resets the integral term. As a result, the synchronization controller 250 can reset the sampling rate of the ADC 12 to the default value (e.g., 16 kHz).

Figure 7:
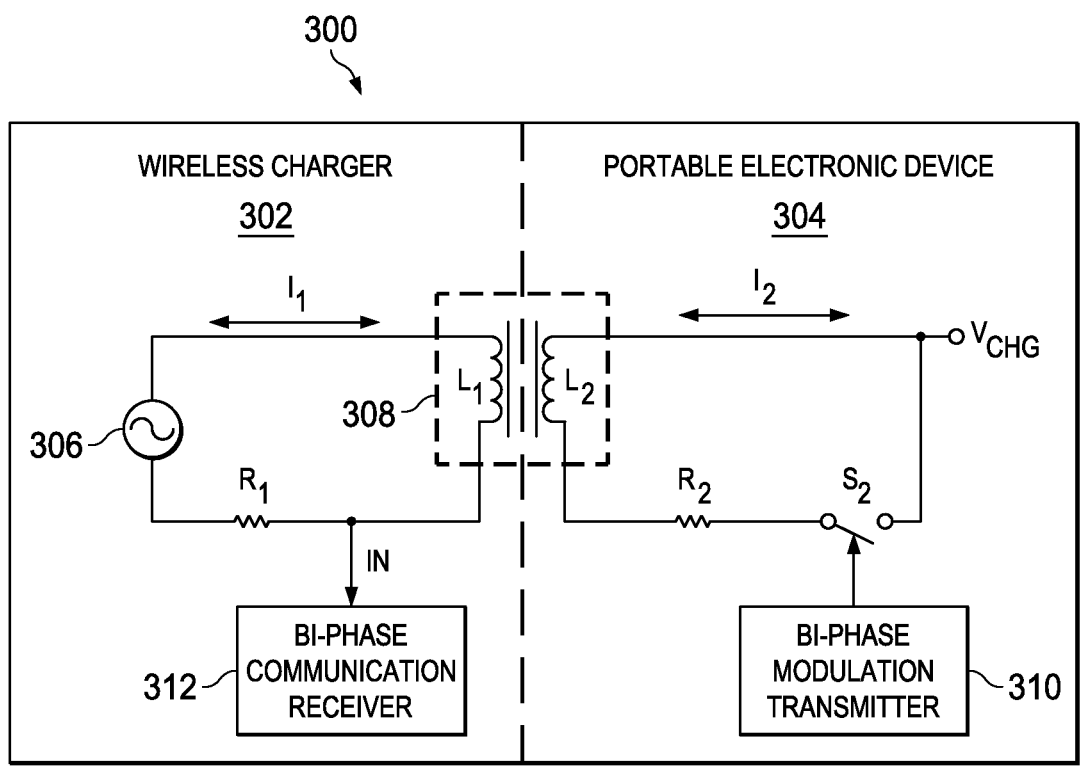
FIG. 7 illustrates an example of a wireless power system in accordance with an aspect of the invention.

FIG. 7 illustrates an example of a wireless power system 300 in accordance with an aspect of the invention. The wireless power system 300 includes a wireless charger 302 and a portable electronic device 304. As an example the portable electronic device 304 can be a wireless communication device. In the example of FIG. 7, the wireless charger 302 includes a current supply 306 that generates a current $I_1$ through an inductor $L_1$ and a resistor $R_1$. The portable electronic device 304 includes an inductor $L_2$ through which a current $I_2$ is induced to flow through a resistor $R_2$ based on the magnetic field generated through the inductor $L_1$. Therefore, the inductor $L_1$ in the wireless charger 302 and the inductor $L_2$ in the portable electronic device 304 collectively form a transformer 308. As a result, a voltage $V_{CHG}$ is provided to the portable electronic device 304 to power the portable electronic device 304 and/or charge a battery (not shown) within the portable electronic device 304.

As an example, it may be necessary or desirable for the portable electronic device 304 to communicate with the wireless charger 302. As an example, the portable electronic device 304 may provide messages to the wireless charger 302 to indicate that it is receiving power from the wireless charger 302, to indicate that it is fully charged, or to provide any of a variety of other indications. In the example of FIG. 7, the portable electronic device 304 includes a bi-phase modulation transmitter 310 that is coupled to a switch $S_2$. The bi-phase modulation transmitter 310 can thus open and close the switch $S_2$ to modulate a bi-phase modulation signal, such as the bi-phase modulation signal IN, into the current $I_2$, such that the opening and closing of the switch provides logic-low and logic-high states, respectively, of the current $I_2$. Because power in the wireless power system 300 is conserved, the bi-phase modulation signal that is modulated onto the current $I_2$ is likewise modulated onto the current $I_1$ through the inductive coupling of the transformer 308.

The wireless charger 302 includes a bi-phase communication receiver 312 that is coupled to the current path of the current supply 306, the inductor $L_1$, and the resistor $R_1$. The bi-phase communication receiver 312 is thus configured to monitor the primary current $I_1$, and thus to demodulate the bi-phase modulation signal from the primary current $I_1$. As an example, the bi-phase communication receiver 312 can monitor one or more of a voltage, power, or the primary current $I_1$ itself to demodulate the bi-phase modulation signal IN. For example, the bi-phase communication receiver 312 can be configured substantially similar to the bi-phase communication receiver 10 in the example of FIG. 1. Specifically, the bi-phase communication receiver 312 can include the ADC 12 that is configured to generate the digital samples of the bi-phase modulation signal IN at a substantially constant frequency (e.g., 16 kHz) corresponding to the magnitude of the primary current $I_1$ or an associated voltage (e.g., of a resonant capacitor (not shown)) or power, and thus the bi-phase modulation signal IN. The bi-phase communication receiver 312 can also include the preamble detector 16 and the bi-phase signal decoder 14 in the example of FIG. 1. Therefore, the bi-phase communication receiver 312 can detect and/or align the preamble of the bi-phase modulation signal IN to decode the digital samples of the current $I_1$ generated from the ADC 12 to generate an output signal CODE_OUT, such as described previously in the examples of FIGS. 1 through 4. Furthermore, the preamble detector 16 can include the synchronization controller 250, such that the sampling rate of the ADC 12 can be substantially synchronized with a clock frequency of the bi-phase modulation transmitter 310, such as described previously in the examples of FIGS. 2 and 6.

It is to be understood that the wireless power system 300 is not intended to be limited to the example of FIG. 7. Specifically, the wireless power system 300 is demonstrated simplistically, such that a variety of additional circuit and/or communication components have been omitted from the example of FIG. 7. As an example, the circuits through which the currents $I_1$ and $I_2$ flow can include any of a variety of additional circuit components, such as arrangements of resistors and/or capacitors for providing the voltage $V_{CHG}$. As another example, the bi-phase modulation transmitter 310 can be provided commands from or can be configured as part of a processor (not shown). Furthermore, the wireless power system 300 can include any of a variety of additional devices for providing and/or receiving power, such as additional portable electronic devices being inductively coupled to additional inductors. Accordingly, the wireless power system 300 can be configured in any of a variety of ways.

In the wireless power system 300, adjusting a resonant frequency on the primary side (i.e., the wireless charger), such as to control the level of power transfer, can result in a phenomenon in which a modulation depth changes polarity. The modulation depth, as described herein, is defined as the change in amplitude of the bi-phase modulation signal IN when the resistor $R_2$ is switched in and out by the switch $S_2$. The change in polarity of the modulation depth can be caused based on the addition of the load associated with the resistor $R_2$ changing the resonance characteristics of the wireless power system 300.

As an example, at high frequencies, there can be an increase in amplitude of the bi-phase modulation signal IN when the bi-phase modulation transmitter 310 switches the switch $S_2$ to add the load of the resistor $R_2$, but at lower frequencies, there is a decrease in amplitude of the bi-phase modulation signal IN. Both of these scenarios are acceptable for communication via the bi-phase communication signal IN. However, at the resonant frequency where the amplitudes cross, there is no apparent change in the amplitude of the bi-phase modulation signal IN when the bi-phase modulation transmitter 310 switches the switch $S_2$ to add the load of the resistor $R_2$. Accordingly, at the null frequency, no communication is possible.

Therefore, the bi-phase communication receiver 312 can be configured to receive the bi-phase modulation signal IN as a two-channel signal, such as having different null frequencies associated with the wireless power system 300. For example, the bi-phase communication receiver 312 can be configured to monitor a first bi-phase modulation channel associated with a voltage across a resonant capacitor (not shown) and a second bi-phase modulation channel associated with a current in the primary inductor $L_1$ of the transformer 308. Detection of two separate bi-phase modulation channels can be institutionally required, such as mandated by the WPC, such that a typical bi-phase communication receiver may redundantly decode the two bi-phase modulation channels to ensure data transfer from the transmitter to the receiver to mitigate the presence of a null zone for a given channel.

Figure 8:
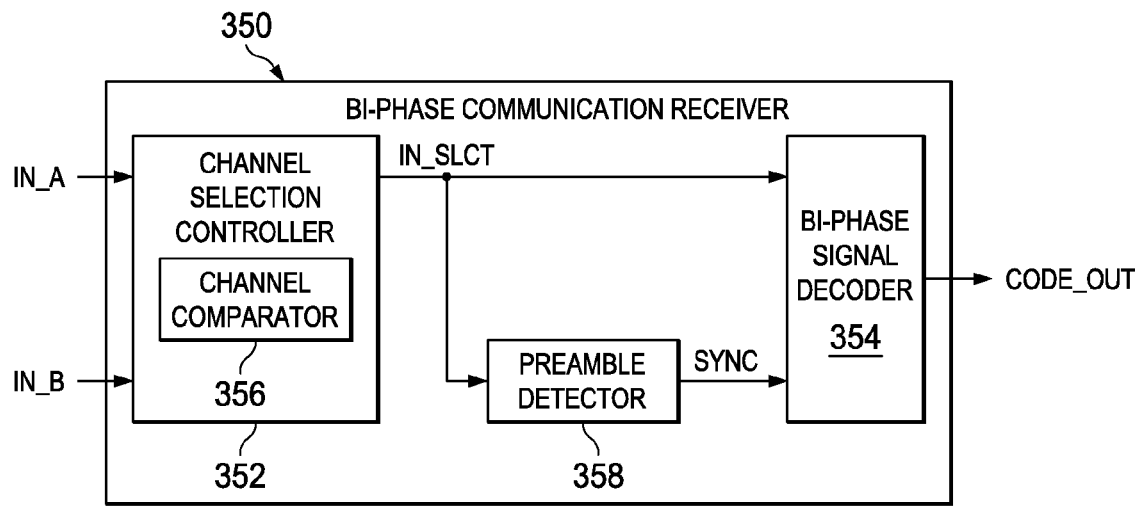
FIG. 8 illustrates another example of a bi-phase communication receiver in accordance with an aspect of the invention.

FIG. 8 illustrates another example of a bi-phase communication receiver 350 in accordance with an aspect of the invention. The bi-phase communication receiver 350 is configured to receive a first bi-phase modulation channel IN_A and a second bi-phase modulation channel IN_B, and to decode only one of the bi-phase modulation channels IN_A and IN_B to generate an output code CODE_OUT. The decoding of only one of the bi-phase modulation channels IN_A and IN_B to generate the output code CODE_OUT is accomplished via a channel selection controller 352.

The channel selection controller 352 is configured to monitor an amplitude of the bi-phase modulation channels IN_A and IN_B and to select one of the bi-phase modulation channels IN_A and IN_B for decoding by a bi-phase signal decoder 354. The channel selection controller 352 includes a channel comparator 356 configured to compare a relative magnitude between the bi-phase modulation channels IN_A and IN_B. The channel selection controller 352 can thus be configured to select the one of the bi-phase modulation channels IN_A and IN_B having the greatest relative amplitude. The selected one of the bi-phase modulation channels IN_A and IN_B is thus provided to the bi-phase signal decoder 354 for decoding, demonstrated in the example of FIG. 8 as a signal IN_SLCT. Upon selecting the one of the bi-phase modulation channels IN_A and IN_B having the greatest relative amplitude, the channel selection controller 352 can discard the other of the bi-phase modulation channels IN_A and IN_B. Therefore, the bi-phase communication receiver 350 can conserve circuitry and/or processing resources by only decoding a single bi-phase modulation channel, as opposed to redundantly decoding both bi-phase modulation channels, such as implemented by typical bi-phase receiver systems.

In addition, similar to the example of FIG. 1, the bi-phase communication receiver system 350 includes a preamble detector 358. The preamble detector 358 is configured to detect and/or align the period of the selected bi-phase modulation channel IN_SLCT to the bi-phase signal decoder 354. Therefore, the bi-phase signal decoder 354 can be synchronized with the selected bi-phase modulation signal IN_SLCT for proper decoding via a signal SYNC provided from the preamble detector 358, such as described previously in the examples of FIGS. 1 through 5. In the example of FIG. 8, preamble detector 358 can operate substantially similar to the preamble detector 16 in the example of FIG. 1. However, the channel selection controller 352 can operate in either of the analog or digital domains. As an example, the channel selection controller 352 can be configured to compare the analog bi-phase modulation channels IN_A and IN_B, such that the preamble detector 358 can include an ADC for generating digital samples of the selected bi-phase modulation channel IN_SLCT. As another example, the bi-phase communication receiver system 350 can include at least one ADC (not shown) configured to generate digital samples for each of the bi-phase modulation channels IN_A and IN_B, or for the selected bi-phase modulation channel IN_SLCT, such that the selected bi-phase modulation channel IN_SLCT is provided to the preamble detector 358 as a stream of digital samples. As yet a further example, the channel selection controller 352 can be incorporated into the preamble detector 358.

Figure 9:
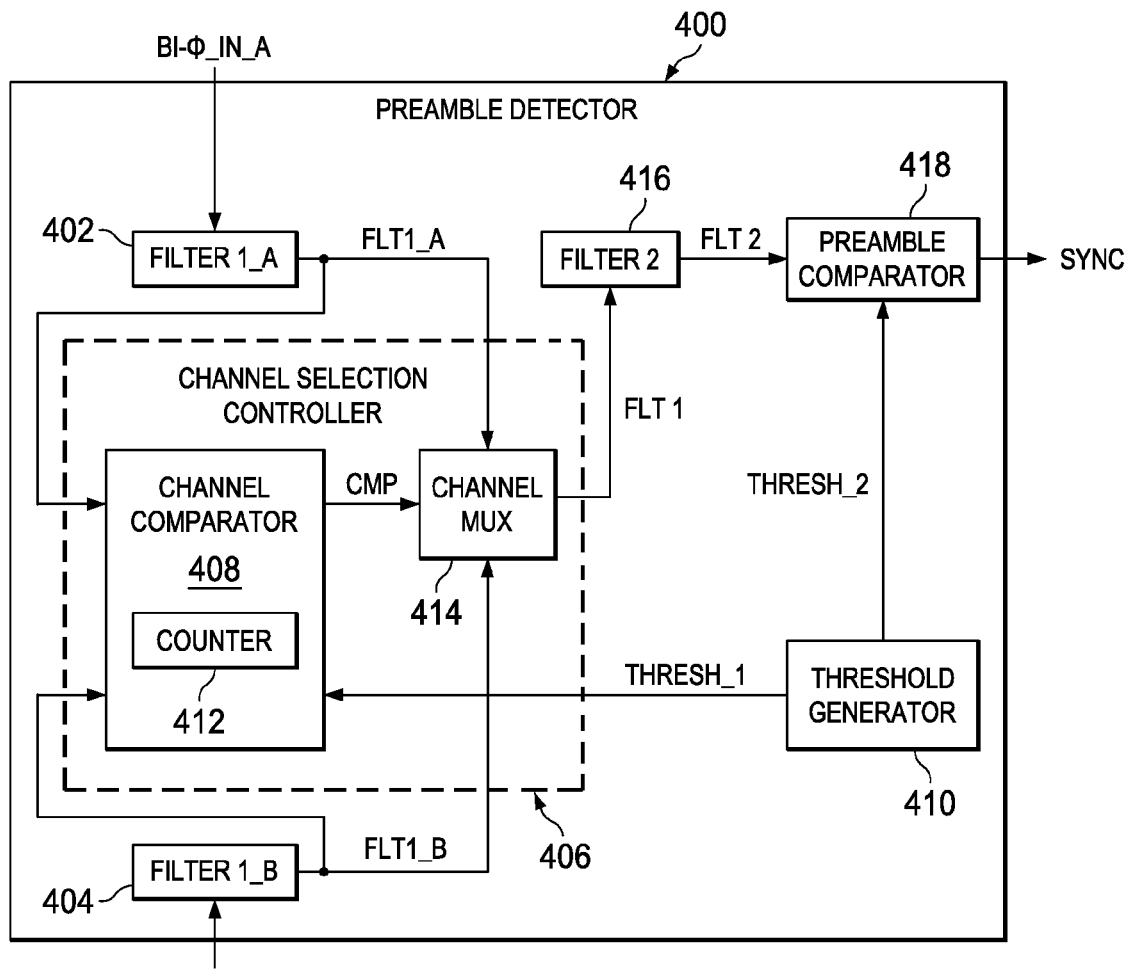
FIG. 9 illustrates another example of a preamble detector in accordance with an aspect of the invention.

FIG. 9 illustrates another example of a preamble detector 400 in accordance with an aspect of the invention. The preamble detector 400 includes a first digital filter 402 that is configured to evaluate the digital samples of the first bi-phase modulation channel BI-Φ_IN_A and a second digital filter 404 that is configured to evaluate the digital samples of the second bi-phase modulation channel BI-Φ_IN_B. In the example of FIG. 9, it is to be understood that the bi-phase communication receiver in which the preamble detector 400 is arranged includes an ADC to convert each of the bi-phase modulation channels IN_A and IN_B into the respective digital samples of the channels BI-Φ_IN_A and BI-Φ_IN_B. Therefore, similar to as described in the example of FIGS. 1 through 5, the first and second digital filters 402 and 404 can be configured as FIR filters including filter taps that are pre-programmed with tap weights associated with at least one period of the preambles of the bi-phase modulation channels IN_A and IN_B, such as demonstrated in the example of FIG. 3. The first and second digital filters 402 and 404 are each configured to iteratively shift the respective digital samples of the channels BI-Φ_IN_A and BI-Φ_IN_B to generate respective outputs FLT1_A and FLT1_B at each iteration.

The preamble detector 400 includes a channel selection controller 406 that includes a channel comparator 408. The outputs FLT1_A and FLT1_B provided from the respective first and second digital filters 402 and 404 are each provided to the channel comparator 408, such that the channel comparator 408 is configured to compare the amplitude of each of the outputs FLT1_A and FLT1_B at each iteration. In addition, the bi-phase modulation channels BI-Φ_IN_A and BI-Φ_IN_B can include noise and/or other interference, and the preamble detector 400 can be operating substantially continuously, such as while waiting for valid data to be transmitted from the associated transmitter. Therefore, the channel comparator 408 is also configured to compare the outputs FLT1_A and FLT1_B with a threshold signal THRESH_1 generated by a threshold generator 410. As an example, the threshold signal THRESH_1 can be generated as a moving average of the digital samples from at least one of the bi-phase modulation channels BI-Φ_IN_A and BI-Φ_IN_B, such as the one having the highest relative amplitude. For example, the threshold signal THRESH_1 can be generated in a manner substantially similar to Equation 2, such as having a different (e.g., lesser) scale factor K that the threshold signal implemented for a respective preamble comparator.

Furthermore, the channel comparator 408 includes a counter 412 configured to count the iterations associated with consecutive comparisons performed by the channel comparator 408. As an example, because of the potential presence of noise and/or other interference on bi-phase modulation channels BI-Φ_IN_A and BI-Φ_IN_B, it is possible for the relative amplitudes of the bi-phase modulation channels BI-Φ_IN_A and BI-Φ_IN_B, and thus the respective outputs FLT1_A and FLT1_B, to vary relative to each other over time. Therefore, counter 412 can be configured to count a predetermined number of consistent comparisons before the channel comparator 408 selects one of the bi-phase modulation channels BI-Φ_IN_A and BI-Φ_IN_B. As a result, the counter 412 can be configured to ensure that the relative amplitudes between the bi-phase modulation channels BI-Φ_IN_A and BI-Φ_IN_B are stable before the appropriate channel is selected. Accordingly, the channel comparator 408 selects the one of the bi-phase modulation channels BI-Φ_IN_A and BI-Φ_IN_B having the relatively greater amplitude that is also greater than the threshold signal THRESH_1 for a predetermined number of consecutive iterations.

In the example of FIG. 9, each of the output signals FLT1_A and FLT1_B are also provided to a channel multiplexer 414 in the channel selection controller 406. Upon selecting a given one of the bi-phase modulation channels BI-Φ_IN_A and BI-Φ_IN_B, the channel comparator 408 provides a signal CMP to the channel multiplexer 414 to indicate the selected channel. The channel multiplexer 414 thus provides the selected channel as an output FLT1 having the outputs associated with the one of the first and second digital filters 402 and 404 corresponding to the selected one of the bi-phase modulation channels BI-Φ_IN_A and BI-Φ_IN_B. The other one of the bi-phase modulation channels BI-Φ_IN_A and BI-Φ_IN_B is thus discarded, and is processed no further by the preamble detector 400.

In the example of FIG. 9, the preamble detector 400 also includes a third digital filter 416 that is configured to evaluate the output signal FLT1 corresponding to the selected channel. Similar to as described previously in the example of FIG. 2, the third digital filter 416 can be configured as a FIR filter including filter taps that are preprogrammed with tap weights associated with logic transitions of the bi-phase modulation channels IN_A and IN_B, such as demonstrated in the examples of FIGS. 3 and 5. The third digital filter 416 can thus be configured to amplify the peaks of the signal FLT1 to provide amplification and further filtering of the output signal FLT1. The threshold generator 410 is also configured to generate a threshold signal THRESH_2, which can be based on the digital samples of at least one of the bi-phase modulation channels BI-Φ_IN_A and BI-Φ_IN_B (e.g., the selected channel), such as based on Equation 2 described previously. Accordingly, the threshold signal THRESH_2 and the output signal FLT2 can be provided to a preamble comparator 418 for detecting and/or determining alignment of the period of the selected one of the bi-phase modulation channel IN_A and IN_B, as described previously in the example of FIGS. 1 through 5.

Accordingly, by selecting only one of the bi-phase modulation channels BI-Φ_IN_A and BI-Φ_IN_B for decoding, the preamble detector 400 can conserve processing resources (e.g., decreasing MIPS) relative to typical bi-phase communication receiver systems that decode two bi-phase modulation channels. In addition, because the channel selection is based on the greater relative amplitude between the bi-phase modulation channels IN_A and IN_B, the selected channel is furthest from the null zone on the frequency spectrum of the associated wireless power system, such as the wireless power system 300, to ensure sufficient amplitude distinction for proper decoding. It is to be understood that the preamble detector 400 in the example of FIG. 9 is but one example of a manner of implementing channel selection for decoding only a single bi-phase modulation channel, and that other implementations based on a relative amplitude between the respective channels can be implemented. Furthermore, while not depicted in the example of FIG. 9, the preamble detector 400 can also include a synchronization controller, such as the synchronization controller 250 described previously in the example of FIG. 6, to adjust the sampling rates of associated ADCs in the respective bi-phase communication receiver system.

It is to be understood that the preamble detector 400 is not limited to the example of FIG. 9. As one example, the channel comparator 408 could be configured to compare the bi-phase modulation channels BI-Φ_IN_A and BI-Φ_IN_B directly, instead of the outputs of the respective first and second first and second digital filters 402 and 404. As another example, the channel that is selected by the channel multiplexer 414 is not limited to the outputs signals FLT1_A and FLT1_B of the respective first and second first and second digital filters 402 and 404. For example, the preamble detector 400 could replace the third digital filter 416 with two such digital filters 416 (e.g., having the tap weights demonstrated in the example of FIG. 5) that are coupled to the respective outputs of the first and second digital filters 402 and 404. Thus, the channel multiplexer 414 could select between respective outputs FLT2_A and FLT2_B, such that an output FLT2 of the channel multiplexer 414 is provided directly to the preamble comparator 418. Therefore, the preamble detector 400 can be configured in a variety of ways.

Figure 10:
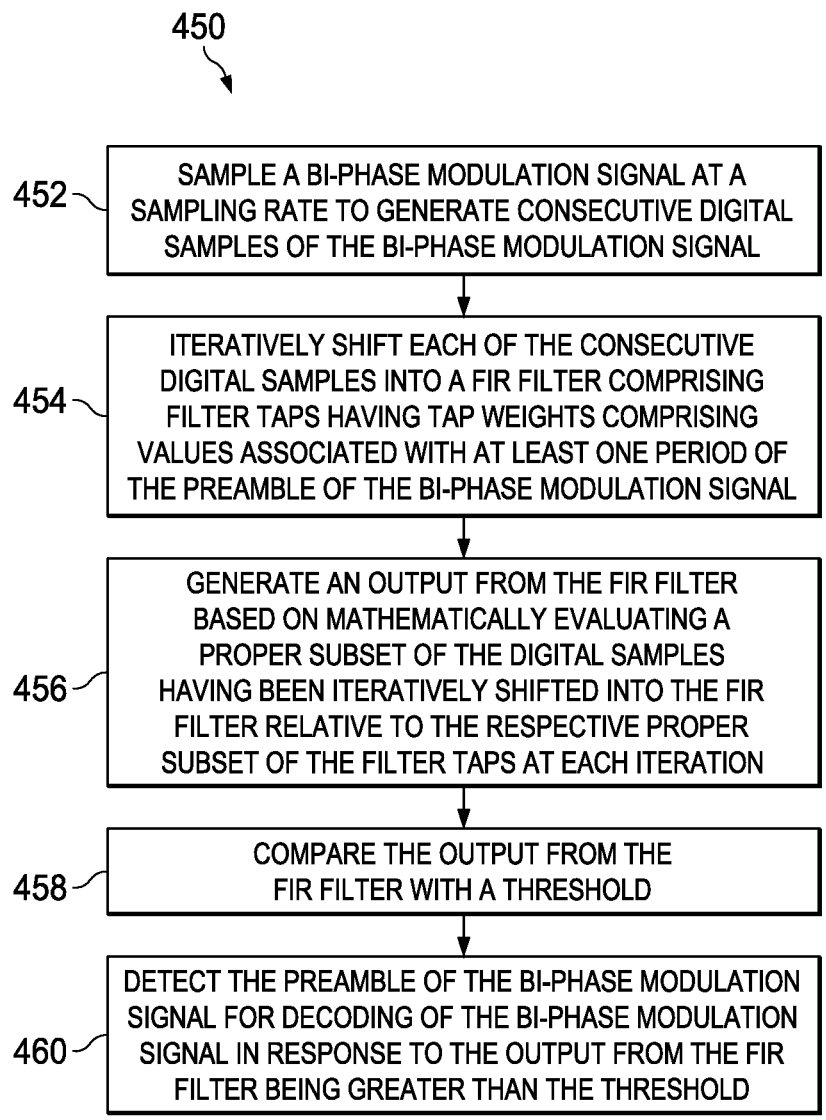
FIG. 10 illustrates an example of a method for detecting a preamble of a bi-phase modulation signal in accordance with an aspect of the invention.

In view of the foregoing structural and functional features described above, certain methods will be better appreciated with reference to FIG. 10. It is to be understood and appreciated that the illustrated actions, in other embodiments, may occur in different orders and/or concurrently with other actions. Moreover, not all illustrated features may be required to implement a method.

FIG. 10 illustrates an example of a method 450 for detecting a preamble of a bi-phase modulation signal. At 452, a bi-phase modulation signal is sampled at a sampling rate to generate consecutive digital samples of the bi-phase modulation signal. The sampling rate could be an eight times oversampling of an approximately 2 kHz data signal by an ADC, such as a sampling rate of approximately 16 kHz. The sampling rate of the ADC can be adjusted based on a detected clock frequency mismatch between the bi-phase communication receiver system and the associated transmitter. At 454, each of the consecutive digital samples are iteratively shifted into a FIR filter comprising filter taps having tap weights comprising values associated with at least one period of the preamble of the bi-phase modulation signal. The filter taps can be arranged substantially similar to the example of FIG. 4. The FIR filter can also be configured as a two-stage filter system including a second FIR filter having filter taps programmed with tap weights associated with logic transitions of the bi-phase modulation signal to provide greater filtering and amplification of the output of the first FIR filter.

At 456, an output from the FIR filter is generated based on mathematically evaluating a proper subset of the digital samples having been iteratively shifted into the FIR filter relative to the respective proper subset of the filter taps at each iteration. The mathematical evaluation of the proper subset can be based on evaluation of the digital samples just shifted in, just shifted out, and at each logic transition during each iteration relative to an immediately preceding output value, such as provided by Equation 1. The output from the FIR filter can provide peak maxima based on alignment of the preamble of the bi-phase modulation signal with the filter taps. At 458, the output from the FIR filter is compared with a threshold. The threshold can be generated as a moving average of the digital samples, such as to compensate for amplitude variation in the bi-phase modulation signal. The output of the FIR filter could be the output from the second FIR filter with the threshold. The comparison can occur downstream of a channel selection controller configured to select one of two bi-phase modulation channels for decoding based on a greater relative amplitude of the respective channels. At 460, the preamble of the bi-phase modulation signal is detected for decoding of the bi-phase modulation signal in response to the output from the FIR filter being greater than the threshold. The bi-phase modulation channel can then be properly decoded by a bi-phase signal decoder.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A bi-phase communication receiver system comprising:
an analog-to-digital converter (ADC) configured to sample a bi-phase modulation signal to generate digital samples of the bi-phase modulation signal;
a bi-phase signal decoder configured to decode the bi-phase modulation signal based on the digital samples; and
a preamble detector comprising a digital filter configured to evaluate the digital samples to generate an output and to detect a preamble of the bi-phase modulation signal for decoding the bi-phase modulation signal based on the output, wherein the digital filter is configured as a finite impulse response (FIR) filter comprising a set of tap weights comprising values associated with at least one period of the preamble of the bi-phase modulation signal and the set of tap weights are arranged in an alternating pattern of a plurality of first values of positive one and a respective plurality of second values of negative one, wherein each of the first and second values correspond to a respective one of the digital samples that are incrementally shifted into the FIR filter.

2. The system of claim 1, wherein the FIR filter is configured to evaluate the digital samples to generate the output by, at each iteration, adding a respective tap weight product of a new digital sample shifted into the FIR filter, subtracting a respective tap weight product of a last digital sample shifted out of the FIR filter, and one of adding and subtracting respective tap weight products of digital samples shifted to respective filter taps associated with logic transitions of the preamble of the bi-phase modulation signal, with respect to an immediately preceding value of the output.

3. The system of claim 1, wherein the preamble detector further comprises a preamble comparator configured to compare the output of the digital filter with a threshold, the period of the preamble of the bi-phase modulation signal being detected in response to the preamble comparator determining that the output of the digital filter is greater than the threshold.

4. The system of claim 3, wherein the preamble detector further comprises a threshold generator configured to generate the threshold as having a moving average based on the amplitude of the digital samples.

5. A wireless power system comprising the bi-phase communication receiver system of claim 1, the wireless power system comprising:
a wireless charger comprising a receiver configured to monitor a primary current associated with a primary inductor, the receiver comprising the bi-phase communication receiver system of claim 1; and
a portable electronic device comprising a transmitter configured to modulate the bi-phase communication signal onto a secondary current associated with a secondary inductor, the primary inductor and secondary inductor collectively forming an isolation transformer configured to transfer energy from the primary inductor to the secondary inductor to generate a voltage in the portable electronic device.

6. A bi-phase communication receiver system comprising:
an analog-to-digital converter (ADC) configured to sample a bi-phase modulation signal to generate digital samples of the bi-phase modulation signal;
a bi-phase signal decoder configured to decode the bi-phase modulation signal based on the digital samples; and
a preamble detector comprising a digital filter configured to evaluate the digital samples to generate an output and to detect a preamble of the bi-phase modulation signal for decoding the bi-phase modulation signal based on the output wherein the digital filter is configured as a two-stage filter comprising a first digital filter and a second digital filter, the second digital filter being configured to sample the output of the first digital filter to amplify and further filter the output of the first digital filter to substantially compensate for noise associated with the bi-phase modulation signal, and wherein the first and second digital filters are configured as finite impulse response (FIR) filters, wherein the first digital filter comprises a set of tap weights comprising values associated with at least one period of the preamble of the bi-phase modulation signal, and wherein the second digital filter comprises a set of tap weights comprising non-zero values associated with taps at each of alternating logic transitions and zero values associated with remaining taps.

7. A bi-phase communication receiver system comprising:
an analog-to-digital converter (ADC) configured to sample a bi-phase modulation signal to generate digital samples of the bi-phase modulation signal;
a bi-phase signal decoder configured to decode the bi-phase modulation signal based on the digital samples; and
a preamble detector comprising a digital filter configured to evaluate the digital samples to generate an output and to detect a preamble of the bi-phase modulation signal for decoding the bi-phase modulation signal based on the output, wherein the output of the digital filter has peak maxima corresponding to alignment of the period of the preamble of the bi-phase modulation signal with preprogrammed filter taps associated with the digital filter, and wherein the preamble detector comprises a synchronization controller configured to detect the peak maxima and to count the digital samples between each of a plurality of consecutive peak maxima to detect a clock frequency mismatch between the bi-phase communication receiver system and an associated transmitter, the peak detector being configured to adjust a sampling rate of the ADC based on the detected mismatch.

8. The system of claim 7, wherein the synchronization controller comprises a proportional/integral loop controller configured to generate a signal indicative of an amount of adjustment to the sampling rate of the ADC proportional to a magnitude of the detected mismatch to adjust the sampling rate of the ADC to converge on a clock frequency of the associated transmitter.

9. A bi-phase communication receiver system comprising:
an analog-to-digital converter (ADC) configured to sample a bi-phase modulation signal to generate digital samples of the bi-phase modulation signal;
a bi-phase signal decoder configured to decode the bi-phase modulation signal based on the digital samples; and
a preamble detector comprising a digital filter configured to evaluate the digital samples to generate an output and to detect a preamble of the bi-phase modulation signal for decoding the bi-phase modulation signal based on the output, wherein the bi-phase modulation signal comprises a first bi-phase modulation channel and a second bi-phase modulation channel, the bi-phase communication receiver system further comprising a channel selection controller configured to select one of the first and second bi-phase modulation channels for decoding by the bi-phase signal decoder based on a relative signal amplitude of the first and second bi-phase modulation channels, the channel selection controller being further configured to discard the other of the first and second bi-phase modulation channels in response to the selection.

10. The system of claim 9, wherein the preamble detector comprises the channel selection controller, wherein the digital filter comprises a first digital filter associated with the first bi-phase modulation channel and a second digital filter associated with the first bi-phase modulation channel, the channel selection controller comprising a channel comparator configured to compare an output of the first digital filter with an output of the second digital filter to select the one of the first and second bi-phase modulation channels.

11. The system of claim 10, wherein the preamble detector comprises at least one additional digital filter configured to sample the output of at least one of the first and second digital filters to amplify and further filter the output of the at least one of the first and second digital filters to substantially compensate for noise associated with the bi-phase modulation signal.

12. The system of claim 10, wherein the channel comparator is further configured to compare the output of the one of the first and second bi-phase modulation channels having the greatest relative signal amplitude with a threshold to select the one of the first and second bi-phase modulation channels upon the greatest relative signal amplitude being greater than the threshold for a predetermined number of consecutive comparisons.

13. The system of claim 12, wherein the preamble detector further comprises a threshold generator configured to generate the threshold as having a moving average based on the amplitude of at least one of the first and second digital samples.

14. A method for detecting a preamble of a bi-phase modulation signal, the method comprising:
sampling a bi-phase modulation signal at a sampling rate to generate consecutive digital samples of the bi-phase modulation signal;
iteratively shifting each of the consecutive digital samples into a finite impulse response (FIR) filter comprising filter taps having tap weights comprising values associated with at least one period of the preamble of the bi-phase modulation signal;
generating an output from the FIR filter based on mathematically evaluating a proper subset of the digital samples having been iteratively shifted into the FIR filter relative to the respective proper subset of the filter taps at each iteration;
comparing the output from the FIR filter with a threshold; and
detecting the preamble of the bi-phase modulation signal for decoding of the bi-phase modulation signal in response to the output from the FIR filter being greater than the threshold.

15. The method of claim 14, wherein generating the output comprises evaluating a new digital sample shifted into the FIR filter, a digital sample shifted out of the FIR filter, and digital samples shifted to respective filter taps associated with logic transitions of the preamble of the bi-phase modulation signal relative to the respective filter taps and adding the sum of the evaluation to an immediately preceding value of the output of the FIR filter.

16. The method of claim 14, wherein iteratively shifting each of the consecutive digital samples comprises iteratively shifting each of the consecutive digital samples into a first FIR filter, and wherein generating the output from the FIR filter comprises generating the output from the first FIR filter, the method further comprising shifting the output of the first FIR filter into a second FIR filter at each iteration to generate a second output that substantially compensates for noise associated with the bi-phase modulation signal, comparing the output from the FIR filter comprises comparing the output from the second FIR filter with the threshold.

17. The method of claim 16, wherein shifting the output of the first FIR filter into the second FIR filter comprises shifting the output of the first FIR filter into the second FIR filter comprising a set of tap weights having non-zero values associated with taps at each of alternating logic transitions and zero values associated with remaining taps.

18. The method of claim 14, wherein determining detecting the preamble of the bi-phase modulation signal comprises determining alignment of the preamble of the bi-phase modulation signal with the filter taps in response to one of peak maxima outputs from the FIR filter being greater than the threshold, the method further comprising:
counting the digital samples between each of a plurality of consecutive peak maxima outputs to detect a clock frequency mismatch between the bi-phase communication receiver system and an associated transmitter;
generating a signal indicative of a magnitude of the detected mismatch; and
adjusting the sampling rate to converge on a clock frequency of the associated transmitter.

19. The method of claim 14, further comprising generating the threshold as a moving average based on the amplitude of the digital samples.

20. The method of claim 14, wherein sampling the bi-phase modulation signal comprises sampling a first bi-phase modulation channel and a second bi-phase modulation channel at the sampling rate to generate first consecutive digital samples and second consecutive digital samples, wherein iteratively shifting each of the consecutive digital samples comprises iteratively shifting each of the first consecutive digital samples into a first FIR filter and a second FIR filter, the method further comprising:
comparing an output of the first FIR filter with an output of the second FIR filter;
selecting one of the first and second bi-phase modulation channels for decoding by the bi-phase signal decoder based on a relative signal amplitude of the first and second bi-phase modulation channels; and
discarding the other of the first and second bi-phase modulation channels in response to the selection.

21. A bi-phase communication receiver system comprising:
a channel selection controller configured to compare an amplitude of a first bi-phase modulation channel and a second bi-phase modulation channel associated with a bi-phase modulation signal, the channel selection controller being further configured to select one of the first and second bi-phase modulation channels for processing and to discard the other of the first and second bi-phase modulation channels based on a relative amplitude of the first and second bi-phase modulation channels;
a preamble detector configured to detect a preamble of the selected bi-phase modulation channel; and
a bi-phase signal decoder configured to decode the selected bi-phase modulation channel.

22. The system of claim 21, further comprising at least one analog-to-digital converter (ADC) configured to sample the first and second bi-phase modulation channels to generate first digital samples and second digital samples, wherein the preamble detector comprises the channel selection controller, and wherein the preamble detector comprises a first digital filter associated with the first bi-phase modulation channel and a second digital filter associated with the first bi-phase modulation channel, the channel selection controller comprising a channel comparator configured to compare an output of the first digital filter with an output of the second digital filter to select the one of the first and second bi-phase modulation channels.

23. The system of claim 22, wherein the channel comparator is further configured to compare the output of the one of the first and second bi-phase modulation channels having the greatest relative signal amplitude with a threshold to select the one of the first and second bi-phase modulation channels upon the greatest relative signal amplitude being greater than the threshold for a predetermined number of consecutive comparisons.

24. The system of claim 23, wherein the preamble detector further comprises a threshold generator configured to generate the threshold as having a moving average based on the amplitude of at least one of the first and second digital samples.

25. The system of claim 22, wherein the preamble detector comprises:
   at least one additional digital filter configured to sample the output of at least one of the first and second digital filters to amplify and further filter the output of the one of the first and second digital filters; and
   a preamble comparator configured to compare the output of the at least one additional digital filter corresponding to the selected channel with a threshold, the preamble of the bi-phase modulation signal being detected in response to the preamble comparator determining that the output of the at least one additional digital filter corresponding to the selected channel is greater than the threshold.

26. The system of claim 25, wherein the output of the third digital filter has peak maxima corresponding to alignment of the period of the preamble of the bi-phase modulation signal with preprogrammed filter taps associated with the digital filter, and wherein the preamble detector comprises a synchronization controller configured to detect the peak maxima and to count the digital samples between each of a plurality of consecutive peak maxima to detect a clock frequency mismatch between the bi-phase communication receiver system and an associated transmitter, the peak detector being configured to adjust a sampling rate of the at least one ADC based on the detected mismatch.

27. The system of claim 25, wherein the preamble detector further comprises a threshold generator configured to generate the threshold as having a moving average based on the amplitude of at least one of the first and second digital samples.

28. The system of claim 21, wherein the first and second digital filters are configured as finite impulse response (FIR) filters each comprising a set of tap weights comprising values associated with at least one period of the preamble of the bi-phase modulation signal.

29. A bi-phase communication receiver system comprising:
   an analog-to-digital converter (ADC) configured to sample a bi-phase modulation signal to generate digital samples of the bi-phase modulation signal;
   a bi-phase signal decoder configured to decode the bi-phase modulation signal based on the digital samples;
   a preamble detector comprising a finite impulse response (FIR) filter comprising filter taps having preprogrammed tap weights with which the digital samples are evaluated to generate an output having peak maxima corresponding to alignment of a period of a preamble of the bi-phase modulation signal with the filter taps; and
   a synchronization controller configured to detect a clock frequency mismatch between the bi-phase communication receiver system and an associated transmitter based on the peak maxima and to adjust a sampling rate of the ADC based on the detected mismatch to substantially compensate for the clock frequency mismatch between the bi-phase communication receiver system and an associated transmitter, wherein the digital filter is configured as a two-stage filter comprising a first FIR filter and a second FIR filter, the second FIR filter being configured to sample the output of the first FIR filter to amplify and further filter the output of the first digital filter to substantially compensate for noise associated with the bi-phase modulation signal, the synchronization controller being configured to detect the clock frequency mismatch based on the peak maxima associated with the second FIR filter.

30. The system of claim 29, wherein the synchronization controller comprises:
   a peak detector configured to detect the peak maxima; and
   a sample counter configured to count the digital samples between each of a plurality of consecutive peak maxima to detect the clock frequency mismatch between the bi-phase communication receiver system and an associated transmitter.

31. The system of claim 30, wherein the synchronization controller further comprises a proportional/integral loop controller configured to generate a signal indicative of an amount of adjustment to the sampling rate of the ADC proportional to a magnitude of the detected mismatch to adjust the sampling rate of the ADC to converge on a clock frequency of the associated transmitter.

32. The system of claim 29, wherein the FIR filter comprises a set of tap weights comprising values associated with at least one period of the preamble of the bi-phase modulation signal.

33. The system of claim 29, wherein the preamble detector further comprises a preamble comparator configured to compare the output of the second FIR filter with a threshold, the period of the preamble of the bi-phase modulation signal being detected in response to the preamble comparator determining that the output of the second FIR filter is greater than the threshold.

34. The system of claim 33, wherein the preamble detector further comprises a threshold generator configured to generate the threshold as having a moving average based on the amplitude of the digital samples.

* * * * *